(12) United States Patent
Kawasumi et al.

(10) Patent No.: US 8,179,139 B2
(45) Date of Patent: May 15, 2012

(54) RECHARGEABLE BATTERY ABNORMALITY DETECTION APPARATUS AND RECHARGEABLE BATTERY APPARATUS

(75) Inventors: Atsushi Kawasumi, Sumoto (JP); Toru Nishikawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 367 days.

(21) Appl. No.: 12/692,841

(22) Filed: Jan. 25, 2010

(65) Prior Publication Data
US 2010/0194398 A1    Aug. 5, 2010

(30) Foreign Application Priority Data

Feb. 5, 2009 (JP) .................................. 2009-24687

(51) Int. Cl.
*G01N 27/416* (2006.01)
*H02J 7/00* (2006.01)
*H02J 7/04* (2006.01)

(52) U.S. Cl. ......... 324/430; 320/132; 320/134; 320/137; 320/151; 320/152; 320/156; 320/161; 324/423; 324/424; 324/425; 324/426; 324/427; 324/428; 324/429; 324/431; 324/432; 324/433; 324/434; 307/46

(58) Field of Classification Search .................. 320/132, 320/134, 137, 151, 152, 156, 161; 324/423, 324/424, 425, 426, 427, 428, 429, 430, 431, 324/432, 433, 434
See application file for complete search history.

(56) References Cited

U.S. PATENT DOCUMENTS

| | | | | |
|---|---|---|---|---|
| 4,181,885 | A | * | 1/1980 | Gosser et al. ................. 324/428 |
| 5,936,384 | A | * | 8/1999 | Fujiwara et al. ............... 320/134 |
| 6,611,128 | B2 | * | 8/2003 | Minamiura et al. ............ 320/134 |
| 2006/0186859 | A1 | * | 8/2006 | Fujikawa et al. .............. 320/134 |
| 2007/0139008 | A1 | | 6/2007 | Sterz et al. |
| 2008/0186029 | A1 | * | 8/2008 | Nishino et al. ................. 324/426 |
| 2008/0186030 | A1 | * | 8/2008 | Kasamatsu et al. ............ 324/426 |
| 2008/0285193 | A1 | * | 11/2008 | Watanabe et al. ............... 361/88 |
| 2009/0167312 | A1 | * | 7/2009 | Keates et al. .................. 324/434 |

FOREIGN PATENT DOCUMENTS

JP    2009-076280    4/2009

* cited by examiner

*Primary Examiner* — Patrick Assouad
*Assistant Examiner* — Steve T Chung
(74) *Attorney, Agent, or Firm* — Wenderoth, Lind & Ponack, LLP

(57) ABSTRACT

The rechargeable battery abnormality detection apparatus is provided with an internal short circuit detection section (20b) that monitors rechargeable battery (1) voltage change when no charging or discharging takes place, and detects internal short circuit abnormality when battery voltage drop during a predetermined time period exceeds a preset threshold voltage; a degradation appraisal section (20d) that judges the degree of rechargeable battery degradation; and a threshold control section (20c) that incrementally increases the threshold voltage according to the degree of degradation determined by the degradation appraisal section (20d).

9 Claims, 3 Drawing Sheets

RECHARGEABLE BATTERY ABNORMALITY DETECTION APPARATUS AND RECHARGEABLE BATTERY APPARATUS

BACKGROUND OF THE INVENTION

1. Field of the Invention

The present invention relates to a rechargeable battery abnormality detection apparatus to detect battery cell internal short circuit abnormalities, and to a rechargeable battery apparatus provided with that abnormality detection apparatus.

2. Description of the Related Art

Rechargeable batteries such as lithium ion rechargeable batteries are used as a power source for various types of electronic equipment by connecting a plurality of battery cells in series in accordance with the power source specifications of the electronic equipment. In these cases, rechargeable battery charging and discharging are controlled consistent with battery voltage, charging capacity, and remaining discharge capacity. Further, rechargeable battery abnormality can be detected and battery use prohibited, or depending on the degree of battery degradation, the existing rechargeable battery characteristics can be utilized in an optimal fashion.

One example of the treatment of a detected rechargeable battery abnormality is suggested in Japanese Patent Application 2007-243049 previously submitted by the present applicant et al. Here, internal short circuit (so-called micro-short) caused by a defect within a battery cell is detected, and use of the rechargeable battery with the internal short circuit is prohibited. As an example of a technique for control depending on the degree of rechargeable battery characteristic degradation for the case of rechargeable battery performance (charging capacity) degradation, charging with a lower current to increase charging is recommended.

For example, refer to US Patent Application Disclosure 2007/0139008.

SUMMARY OF THE INVENTION

Incidentally, the internal short circuit described above indicates an unintended internal shorting condition in the rechargeable battery, and this phenomenon exhibits internal current flow (internal discharging current flow) and remaining battery capacity loss even when the rechargeable battery is not being charged or discharged. This type of internal short circuit can be observed, for example, in a rechargeable battery having a nominal voltage of 4.2V, as a phenomenon where the battery voltage drops 20 mV or more in a period of approximately 30 min with no charging or discharging current flow. This drop in battery voltage due to an internal short circuit is significantly greater than the drop in battery voltage due to self-discharge generally inherent in a rechargeable battery.

However, the amount of battery voltage drop due to a rechargeable battery internal short circuit is not always the same. Accordingly, the present applicants sought to verify effects related to battery voltage drop due to internal short circuit described above. For example, as shown in FIG. 4, a large difference was discovered between a new rechargeable battery (characteristic A) and rechargeable batteries used over a long period (characteristics B and C). In FIG. 4, as a test of equivalence with micro-shorts and shorts (internal short circuits), batteries were discharged to an external load (for example, at 0.5 C to 0.05 C and at 0.5 C in FIG. 4) and generation of effects equivalent to those for micro-shorts and shorts was sought by observing voltage drop.

Specific results of the above test showed the amount of battery voltage drop due to internal short circuit was greater for a rechargeable battery used over a long period than for a new rechargeable battery. Results also showed large variation in battery voltage drop due to internal short circuit for rechargeable batteries used over a long period with performance degradation. Irregardless, prior art generally focused on the effects of voltage drop due to internal short circuit in a new battery (characteristic A), and only that phenomenon was detected as internal short circuit. Therefore, in the case of a performance degraded rechargeable battery used over a long period with gradual voltage drop due only to self-discharge; there is a risk of false detection as internal short circuit.

The present invention was developed considering the information described above. Thus, it is an object of the present invention to provide a rechargeable battery abnormality detection apparatus and rechargeable battery apparatus provided with this abnormality detection apparatus that can reliably detect battery cell internal short circuit abnormality, and specifically does not falsely detect voltage drop due to self-discharge in a rechargeable battery with degraded characteristics as an internal short circuit abnormality.

To achieve the object described above, the rechargeable battery abnormality detection apparatus for the first aspect of the present invention is provided with an internal short circuit detection section that monitors rechargeable battery voltage change when no charging or discharging takes place, and detects internal short circuit abnormality when battery voltage drop during a predetermined time period exceeds a preset threshold voltage; a degradation appraisal section that judges the degree of rechargeable battery degradation; and a threshold control section that updates the threshold voltage according to the degree of degradation determined by the degradation appraisal section.

The degradation appraisal section determines the degree of rechargeable battery degradation based on at least one factor such as the following: the change in rechargeable battery capacity at full charge; the number of rechargeable battery charge-discharge cycles; and the change in rechargeable battery internal resistance. Further, the threshold control section is configured to revise the threshold voltage with the highest of voltages such as the following: threshold voltage updated according to the change in rechargeable battery capacity at full charge; threshold voltage updated according to the number of rechargeable battery charge-discharge cycles; and threshold voltage updated according to the change in rechargeable battery internal resistance. In addition, the internal short circuit detection section is configured to detect rechargeable battery voltage drop within a time period preset according to the rechargeable battery voltage.

The rechargeable battery apparatus for the second aspect of the present invention is provided with a rechargeable battery and an abnormality detection apparatus configured as described above. Further, the rechargeable battery apparatus is provided with a cut-off device that prohibits use of a rechargeable battery determined by the abnormality detection apparatus to have an internal short circuit.

Since the abnormality detection apparatus revises the threshold voltage used to judge internal short circuit in accordance with the degree of rechargeable battery degradation, even when rechargeable battery characteristics degrade and the amount of voltage drop due to self-discharge becomes large, there is no risk of misdetection as an internal short circuit. Consequently, discontinued use of a rechargeable battery because of an internal short circuit abnormality, even though that battery still retains capability as a rechargeable battery, can be effectively prevented. The above and further objects of the present invention as well as the features thereof will become more apparent from the following detailed description to be made in conjunction with the accompanying drawings.

DETAILED DESCRIPTION OF THE EMBODIMENT(S)

Figure 1:
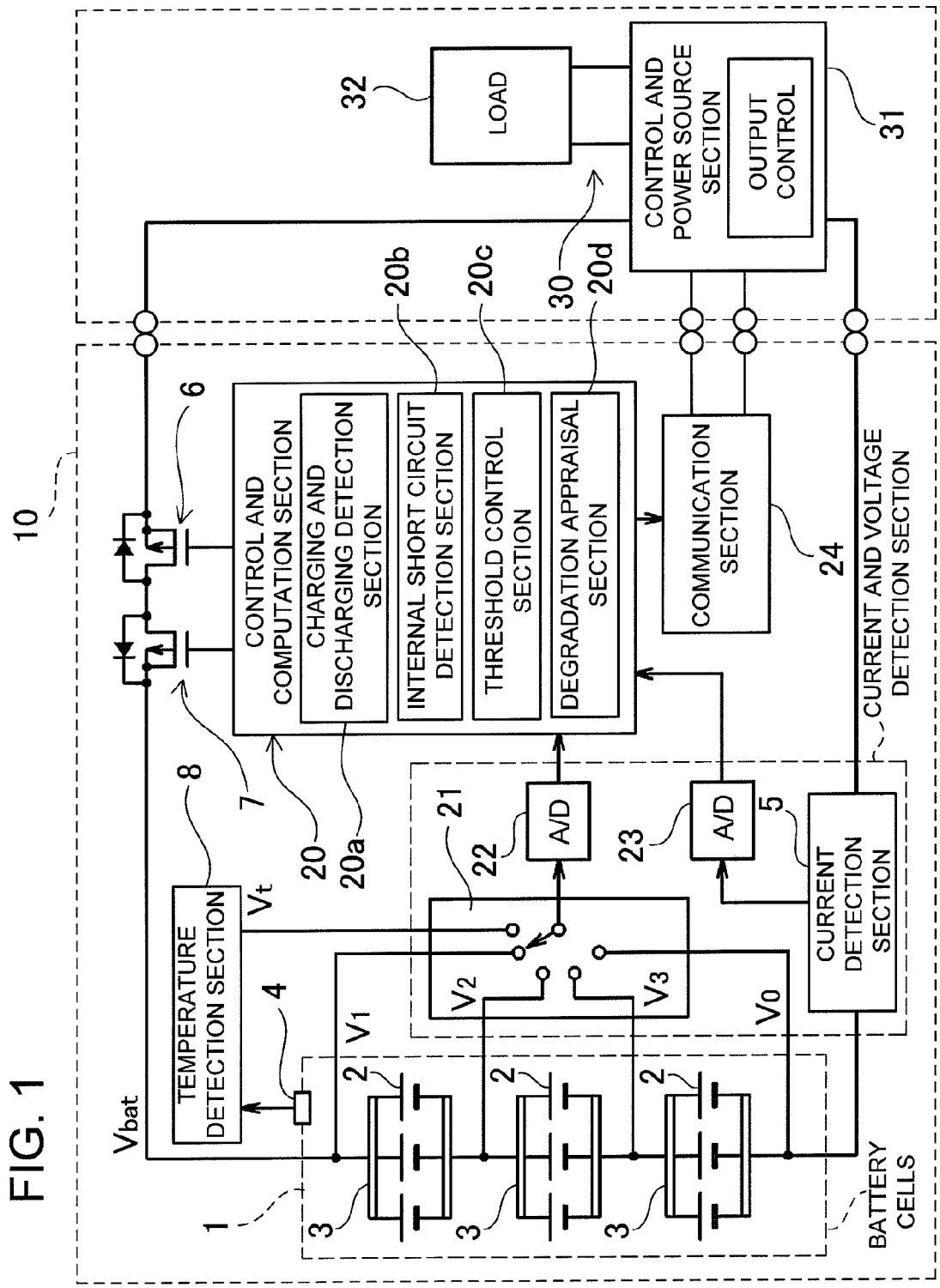
FIG. 1 is an abbreviated block diagram of a rechargeable battery apparatus for an embodiment of the present invention.

The following describes a rechargeable battery abnormality detection apparatus and rechargeable battery apparatus for an embodiment of the present invention based on the figures. The rechargeable battery apparatus is provided with a rechargeable battery, and units such as a rechargeable battery charging and discharging control apparatus, and an abnormality detection apparatus. For example, the rechargeable battery apparatus is used as a so-called "battery pack" by attachment to electronic equipment such as a cellular telephone, or laptop computer. FIG. 1 is an abbreviated block diagram showing important elements of the rechargeable battery apparatus (battery pack) 10 of the present invention. Principally, this battery pack 10 is attached to electronic equipment 30, and is provided with a rechargeable battery 1 that is charged by connection to a control and power source section (battery charger) 31 housed in the electronic equipment 30.

Here, the control and power source section (battery charger) 31 of the electronic equipment 30 is supplied with commercial power, and the rechargeable battery 1 is charged with energy derived from the commercial power source. When the electronic equipment 30 does not use commercial power, the battery pack 10 is used as the electronic equipment power source. Specifically, the battery pack 10 is configured to supply electrical energy stored in the rechargeable battery 1 as a result of battery charging to a load 32 such as the main unit CPU and memory via the control and power source section 31.

The rechargeable battery 1 is made up of individual battery cells such as lithium ion battery cells or nickel-hydride battery cells. For example, the rechargeable battery 1 can be implemented by a plurality of battery cells 2 connected in series to obtain a specified battery voltage and capacity. Specifically, for the case of lithium ion battery cells 2 with a full-charge voltage of 4.2V, three battery cells 2 can be connected in series for a nominal overall voltage of 12.6V. Further, the required battery capacity (current capacity) can be achieved by replacing each battery cell 2 with a plurality of battery cells connected in parallel.

The plurality of battery cells 2 are connected in series and parallel, for example, using connection tabs 3 and wire-leads. The rechargeable battery 1 is formed by packaging this group of battery cells 3 as a single unit. Here, the number of battery cells 2 connected in series and parallel is determined according to the required rechargeable battery specifications of the load 32, and clearly is not limited to the three series-connected sets of three parallel battery cells 2 shown as an example in FIG. 1. Further, a temperature sensor 4 to detect battery temperature (T) such as a thermistor can be formed as a single unit with this type of rechargeable battery 1.

The battery pack 1 is also provided with a current detection section 5 in the rechargeable battery 1 charging and discharging circuit path to detect charging and discharging current (I). For example, the current detection section 5 is made up of a shunt resistor inserted in series in the charging and discharging circuit path, and a sensing amplifier to determine rechargeable battery 1 charging and discharging current (I) from the voltage drop across the shunt resistor. Here, it should be clear that the polarity of the voltage drop across the shunt resistor indicates the direction of rechargeable battery 1 current flow and determines whether it is charging current or discharging current.

Further, a charging control switch 6 to prevent rechargeable battery 1 over-charging and a discharging control switch 7 to prevent rechargeable battery 1 over-discharging are provided in the charging and discharging circuit path. For example, the charging and discharging control switches 6, 7 can be two P-channel metal-oxide-semiconductor field-effect transistors (MOS-FETs) connected in series in the charging and discharging circuit path. These control switches (FETs) 6, 7 are controlled by a control and computation section 20 described below. For example, when a high level (H) control signal is applied to the gate of a control switch (FET) 6, 7, the switch turns OFF to cut-off rechargeable battery 1 charging or discharging current. Specifically, the control switches (FETs) 6, 7 act as charging and discharging cut-off devices that prohibit rechargeable battery 1 charging and discharging.

The previously mentioned control and computation section 20 can be, for example, a microprocessor. Basically, this control and computation section 20 detects the terminal voltage $V_{bat}$ of the rechargeable battery 1 and the terminal voltages $V_{cell}$ of each battery cell 2 that make up the rechargeable battery 1. The control and computation section 20 also inputs battery temperature (T) detected by a temperature detection section 8 using the temperature sensor 4, and rechargeable battery 1 charging and discharging current (I) detected by the current detection section 5 to control charging and discharging of the rechargeable battery 1.

The control and computation section 20 of FIG. 1 selectively inputs via a multiplexer 21 the voltages at the positive terminals $V_1$, $V_2$, $V_3$ of each set of series-connected battery cells 2, the voltage at the negative terminal $V_0$ of the rechargeable battery 1, and the voltage $V_t$ representing battery temperature (T) detected by the temperature detection section 8. These voltages are converted to digital values by an analog-to-digital (ND) converter 22 and input to the control and computation section 20. In addition, charging and discharging current (I) detected by the current detection section 5 is converted to a digital value via an ND converter 23 an input to the control and computation section 20. Here, input of each battery voltage $V_1$, $V_2$, $V_3$ and temperature data $V_t$ is synchronous with the sampling period of the multiplexer 21 and the ND converter 22, and is repeated cyclically with a given period. From the voltage at each positive terminal $V_1$, $V_2$, $V_3$ of the plurality of sets of battery cells 2 and the voltage at the rechargeable battery 1 negative terminal $V_0$, the control and computation section 20 determines the previously mentioned rechargeable battery 1 terminal voltage $V_{bat}=(V_1-V_0)$ and the terminal voltages of each battery cell 2 $V_{cell1}=(V_1-V_2)$, $V_{cell2}=(V_2-V_3)$, and $V_{cell3}=(V_3-V_0)$.

The control and computation section 20, which detects rechargeable battery 1 terminal voltage $V_{bat}$ and charging and discharging current (I) as described above, controls operation of the control and power source section 30 via a communication section 24 to control rechargeable battery 1 charging (full-charge control). The control and computation section 20 also serves to control the charging control switch 6 OFF to prevent rechargeable battery 1 over-charging (over-charging protection), and the discharging control switch 7 OFF to prevent rechargeable battery 1 over-discharging (over-discharging protection). The control and computation section 20 also performs functions such as monitoring remaining battery capacity associated with rechargeable battery 1 charging and discharging as described below, determining performance degradation (lifetime), and when performance degradation is detected, outputting that result. In addition, the control and computation section 20 is has the function of detecting abnormalities such as rechargeable battery 1 internal short circuit and connection tab detachment, and in the case of abnormality, urging replacement by the user of the electronic equipment 30 connected with the battery pack 10.

Rechargeable battery 1 full-charge control suspends charging when full-charge is determined. For example, the terminal voltage $V_{bat}$ of a nickel-hydride rechargeable battery 1 gradually increases during charging, at full-charge the terminal voltage $V_{bat}$ peaks, and subsequently drops by given voltage ($\Delta V$). This phenomenon is utilized to judge ($-\Delta V$ method) rechargeable battery 1 full-charge (100% charge). A lithium ion battery can be charged by constant current-constant voltage charging, where charging is performed with current controlled at or below a specified value followed by voltage controlled at or below a specified value. During constant voltage charging performed after constant current charging, full-charge is determined when the charging current becomes less than or equal to a specified value. Here, it should be apparent that various charging control schemes suggested by prior art such as full-charge detection from the change in battery temperature (T) or the change in charging current (I) can also be appropriately employed. Since the present invention is not directly concerned with rechargeable battery 1 full-charge control in itself, further detail of full-charge control is omitted.

The previously mentioned over-charging protection serves to prevent rechargeable battery 1 over-charging. For example, when rechargeable battery 1 terminal voltage $V_{bat}$ exceeds a preset over-charging protection voltage, or when the voltage $V_{cell}$ of any of the plurality of individual battery cells 2 that make up the rechargeable battery 1 exceeds a battery cell 2 over-charging protection voltage, the charging control switch 6 is activated to forcibly cut-off the charging circuit path and prevent any further charging. In this embodiment, since rechargeable battery 1 terminal voltage $V_{bat}$ is controlled in accordance with the full-charge voltage as described previously for charging control, over-charging prevention by charging control switch 6 activation is essentially employed when an individual battery cell 2 terminal voltage $V_{cell}$ exceeds its over-charging protection voltage.

Further, over-discharging protection serves to prevent rechargeable battery 1 over-discharging. For example, when rechargeable battery 1 terminal voltage $V_{bat}$ drops to approach a preset over-discharging protection voltage, or when the voltage $V_{cell}$ of any of the plurality of individual battery cells 2 that make up the rechargeable battery 1 drops to approach a battery cell 2 over-discharging protection voltage, or when the voltage reaches the over-discharging protection voltage, the discharging control switch 7 is activated to forcibly cut-off the discharging circuit path and prevent any deeper discharge (over-discharging). The control and computation section 20 can also be provided with other protection functions. For example, when a charging or discharging current (I) is detected that is abnormal for the rechargeable battery 1 (over-current), or when the battery temperature detected by the temperature detection section 8 becomes abnormally high such as over 60° C., the charging or discharging control switch 6, 7 or both control switches are activated to cut-off the charging and discharging circuit path and protect not only the rechargeable battery 1 but also other system components such as the load 32.

The feature of the rechargeable battery apparatus (battery pack) 10 configured with the functions above that characterizes the present invention is the control and computation section 20 capability to detect rechargeable battery 1 internal short circuit abnormality (abnormality detection apparatus). This abnormality detection capability (internal short circuit detection capability) is implemented by monitoring rechargeable battery 1 (battery cell 2) voltage $V_{bat}$ ($V_{cell1}$, $V_{cell2}$, $V_{cell3}$) change when the rechargeable battery 1 is not being charged or discharged. Specifically, internal short circuit detection is performed by monitoring rechargeable battery 1 voltage change when no charging or discharging current is detected by the current detection section 5 (zero charging and discharging current). For example, in a static state with no charging or discharging, when battery voltage drop is greater than or equal to 20 mV over a given period such as 30 min, the cause is judged as internal discharging current flow.

In particular, the internal short circuit abnormality detection capability (abnormality detection apparatus) is characterized by updating a threshold value (threshold voltage) according to the degree of rechargeable battery 1 degradation. As a result, battery voltage drop due to self-discharge of a performance degraded rechargeable battery 1 is not misjudged as internal short circuit. Here, the degree of rechargeable battery 1 degradation is determined by factors such as the change in charging capacity at full-charge, the change in rechargeable battery 1 internal resistance, or the number of rechargeable battery 1 charge-discharge cycles.

The control and computation section 20, which detects rechargeable battery 1 internal short circuit abnormality, is provided with a charging and discharging detection section 20a that monitors rechargeable battery 1 charging and discharging and activates an internal short circuit detection section 20b when no charging or discharging is detected; a degradation appraisal section 20d that detects the degree of rechargeable battery 1 degradation; and a threshold control section 20c that revises the threshold value (threshold voltage) provided to the internal short circuit detection section 20b according to the degree of rechargeable battery 1 degradation detected by the degradation appraisal section 20d.

When the rechargeable battery 1 is not charging or discharging and the charging and discharging current detected by the current detection section 5 is zero, the internal short circuit detection section 20b determines rechargeable battery 1 voltage drop $\Delta V_x$ over a preset time interval (for example, 30 min). The internal short circuit detection section 20b also functions to compare the voltage drop $\Delta V_x$ with the predetermined threshold voltage $V_{th}$. Further, when the voltage drop $\Delta V_x$ exceeds the threshold voltage $V_{th}$, that condition is detected as an abnormality in which a rechargeable battery 1 internal short circuit is generated. The threshold control section 20c gradually revises upward the threshold voltage $V_{th}$ used to determine internal short circuit abnormality in accordance with the degree of degradation detected by the degradation appraisal section 20d. This serves to prevent battery voltage drop due to normal self-discharge in a rechargeable battery with degraded characteristics from being mistakenly detected as an internal short circuit abnormality.

Figure 2:
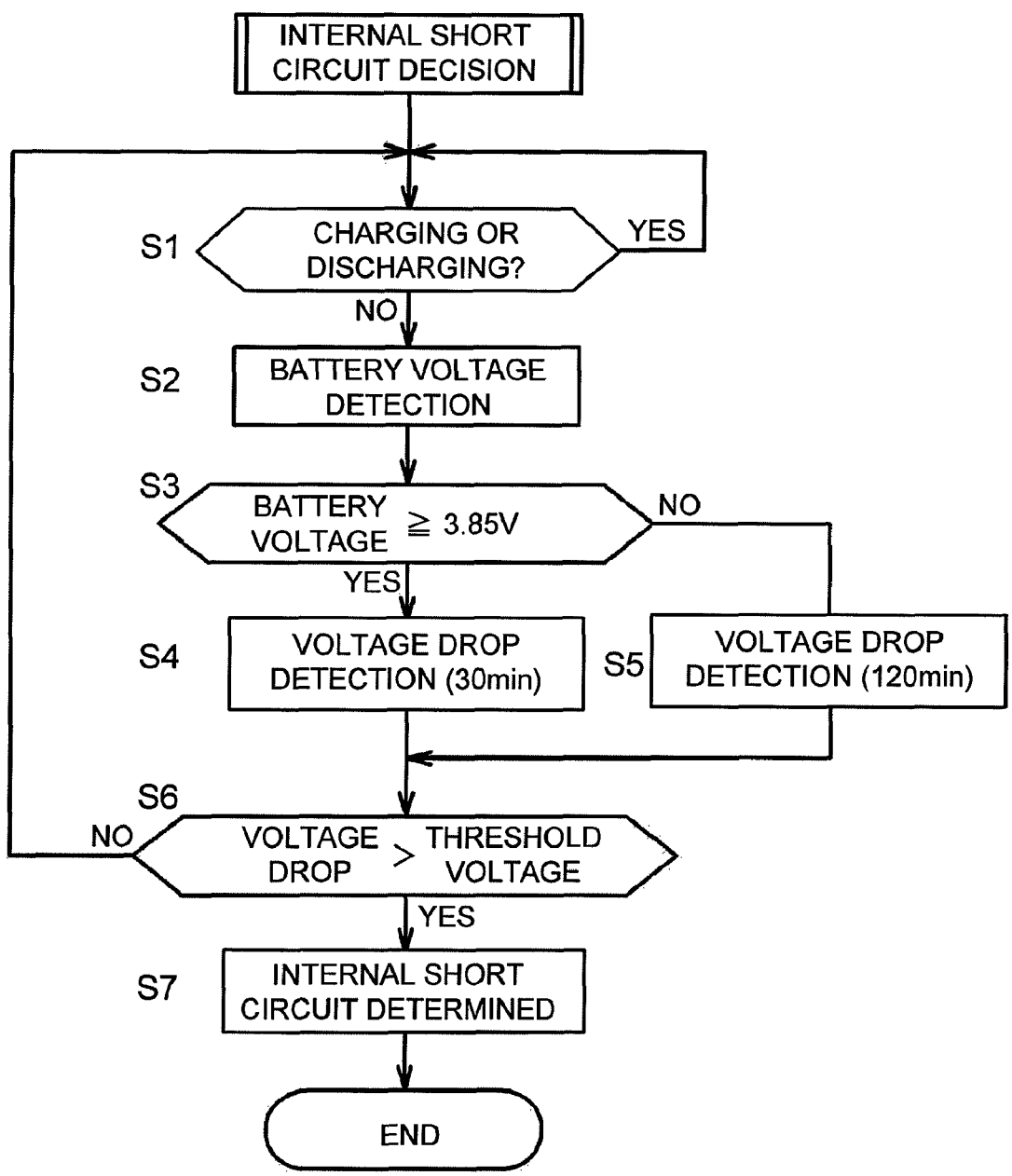
FIG. 2 is a flowchart showing an example of rechargeable battery internal short circuit detection in a rechargeable battery apparatus.

FIG. 2 is a flowchart outlining an example of a decision procedure performed by the internal short circuit detection section 20b. This internal short circuit abnormality decision procedure begins by confirming that the rechargeable battery 1 is not being charged or discharged [step S1]. Next, rechargeable battery 1 voltage is detected [step S2], and it is determined whether or not that battery voltage is greater than or equal to a preset voltage [step S3]. Specifically, in the case of lithium ion battery cell voltage detected as the rechargeable battery 1 voltage, the preset voltage can be a voltage near the battery full-charge voltage such as 3.85V. Here, it is determined if the rechargeable battery 1 voltage is greater than or equal to 3.85V, or if remaining capacity has decreased and the battery voltage is accordingly less than 3.85V [step 3].

When the rechargeable battery 1 is near the full-charge state and battery voltage is high, voltage drop due to internal discharge caused by internal short circuit is relatively fast and the voltage drop $\Delta V_{x\_30}$ can be detected, for example, over a 30 min time interval (first preset time interval) [step 4]. In contrast, when rechargeable battery 1 remaining capacity has decreased and battery voltage is low, voltage drop due to internal discharge caused by internal short circuit is relatively slow and the voltage drop $\Delta V_{x\_120}$ can be detected, for example, over a 120 min time interval (second preset time interval) [step 5]. Next, the voltage drop $\Delta V_{x\_30}$ ($\Delta V_{x\_120}$) detected in this manner is compared to a preset threshold voltage (for example, 20 mV) [step S6]. If the voltage drop $\Delta V_{x\_30}$ ($\Delta V_{x\_120}$) exceeds the threshold voltage, internal short circuit generation is determined [step S7]. However, if the voltage drop $\Delta V_{x\_30}$ ($\Delta V_{x\_120}$) does not exceed the threshold voltage, that voltage drop is determined to be due to normal battery self-discharge with no internal short circuit generation.

In the case where the rechargeable battery 1 is configured with a plurality of series-connected battery cells, voltage drop $\Delta V_x$ can be, for example, determined for each battery cell. Since it is extremely rare for internal short circuit to occur simultaneously in a plurality of battery cells, the difference [max$\Delta V_x$–min$\Delta V_x$] between the maximum battery cell voltage drop max$\Delta V_x$ and the minimum battery cell voltage drop min$\Delta V_x$ can be detected to determine if internal short circuit has occurred. In this case, effects due to normal battery cell self-discharge are removed, and it is possible to detect voltage drop caused only by internal short circuit.

The abnormality detection apparatus of the present invention is characterized in that the threshold voltage $V_{th}$, which is used as the decision threshold for determining rechargeable battery 1 internal short circuit, is revised corresponding to the degree of rechargeable battery 1 degradation. Accordingly, the following briefly describes evaluation of the degree of rechargeable battery 1 degradation for threshold voltage $V_{th}$ revision. The degree of rechargeable battery 1 degradation is determined by the degradation appraisal section 20d. For example, the battery is charged to full-charge according to the previously described full-charge control, and the rechargeable battery 1 full-charge capacity (maximum possible charge-capacity) can be evaluated to determine the degree of degradation.

It is also possible to evaluate the degree of degradation from the change in rechargeable battery 1 internal resistance. In addition, the degree of degradation can be evaluated from the number of repeated rechargeable battery 1 charging and discharging cycles. However, it is also clearly possible to detect battery performance degradation by any well known prior art technique other than those mentioned above. Further, it is also possible to detect battery performance degradation by a plurality of techniques, and use the most degraded value as the detected degradation result.

Incidentally, the detection of battery performance degradation based on the change in full-charge capacity focuses on the fact that the allowable charging capacity of the rechargeable battery 1 decreases as the battery characteristics degrade. Here, for example, the maximum allowable charging capacity of a new rechargeable battery 1 and the maximum allowable charging capacity of a rechargeable battery 1 that has reached the end of its usable lifetime are determined. Based on those maximum charging capacities, a table or function is established relating rechargeable battery 1 actual charging capacity and the degree of performance degradation. Here, the function does not need to be a linear function. In operation, the actual charging capacity, which is the amount of charging needed to fully-charge a completely discharged rechargeable battery 1, is measured and the degree of rechargeable battery 1 degradation is determined from the table or function described above.

It is also possible to determine the full-charge capacity as the rechargeable battery 1 charging capacity corresponding to characteristics such as the number of repeated rechargeable battery 1 charging and discharging cycles (so-called cycle count). The full-charge capacity can be determined, for example, as the integrated discharge capacity of a fully-charged rechargeable battery 1 that is completely discharged. It can also be determined as the integrated charge capacity of a completely discharged rechargeable battery 1 that is charged to full-charge. The full-charge capacity can also be determined by multiplying rechargeable battery 1 charging current by a specified charging efficiency, and by computation considering the discharging current and a specified discharging efficiency. Here, the degree of degradation can be determined as follows. Specifically, the ratio of the full-charge capacity determined during use (FC) to the full-charge capacity for an unused rechargeable battery 1 that is specified by design (design capacity DC) (FC/DC) can be used to find the degree of degradation 1/(FC/DC).

The technique of determining rechargeable battery 1 performance degradation from internal battery resistance focuses on the fact that internal resistance increases with battery performance degradation. Here, rechargeable battery 1 internal resistance R can be determined from battery terminal voltage $E_{ocv}$ with no load and battery voltage $E_{ccv}$ when rechargeable battery 1 current I flows as $$R = (E_{ocv} - E_{ccv})/I.$$

Consequently, if a table or function for the degree of rechargeable battery 1 characteristic degradation is established corresponding to internal resistance R, the degree of battery characteristic degradation can be determined from the internal resistance computed as described above.

Specifically, actual measurements can be made of the minimum internal resistance $R_{min}$ corresponding to a new rechargeable battery 1 and maximum internal resistance $R_{max}$ corresponding to a rechargeable battery 1 that has reached the end of its usable lifetime. Here, when rechargeable battery 1 internal resistance R is equal to the maximum internal resistance $R_{max}$ the degree of degradation is set to 100%, and when internal resistance R is equal to the minimum internal resistance $R_{min}$ the degree of degradation is set to 0%. For example, a table or function can be established that relates the degree of battery degradation to values of the internal resistance from the minimum internal resistance $R_{min}$ to the maximum internal resistance $R_{max}$. This allows the degree of rechargeable battery 1 degradation to be determined from the internal resistance R. Here, the characteristics for the degree of battery degradation versus internal resistance change do not necessarily have to be linear but a monotonically increasing function is desirable.

The following describes determination of the degree of battery degradation based on the number of repeated charging and discharging cycles. One rechargeable battery 1 charging and discharging cycle is defined as a completely discharged battery (0% remaining capacity) taken to full-charge and then completely discharged. As the rechargeable battery 1 is charged and discharged with each repeated cycle, battery performance gradually degrades. Therefore, if the number of charging and discharging cycles is incremented and stored, the degree of rechargeable battery 1 degradation can be estimated from the cycle count.

Instead of counting battery charging and discharging cycles only for the case of a completely discharged rechargeable battery 1 taken to full-charge and then discharged, it is also possible to base the cycle count on integrated values of charging capacity or discharging capacity. Specifically, charging capacity of a repeatedly charged and discharged rechargeable battery 1 can be integrated, and each time that integrated charging capacity reaches the actual capacity of the rechargeable battery 1, it can be counted as one cycle. More specifically, if a rechargeable battery 1 with an actual capacity of 1000 mAh is charged a first time to 500 mAh, charged a second time to 200 mAh, and charged a third time to 300 mAh, one cycle can be counted when the total accumulated charging capacity reaches 1000 mAh. Here, it should be clear that the rechargeable battery 1 can be discharged within the period of a plurality of charging events. Further, within the period of a plurality of charging events, the rechargeable battery 1 can also become fully-charged and charging can be suspended.

Instead of counting charging and discharging cycles based on charging capacity, discharging capacity can be used. Specifically, discharging capacity of a repeatedly charged and discharged rechargeable battery 1 can be integrated, and each time that integrated discharging capacity reaches the actual capacity of the rechargeable battery 1, it can be counted as one cycle. In this case as well, it should be clear that the rechargeable battery 1 can be charged during the period of discharging events.

As another technique, it is also possible to determine rechargeable battery 1 characteristic degradation by measuring battery pack time-in-use. Specifically, a real-time clock (timer) can be installed in the battery pack and used to monitor the time-in-use starting from the point of initial battery pack utilization. More specifically, the actual working-time during rechargeable battery 1 charging and discharging (charging time+discharging time) as well as the standby-time when charging and discharging is suspended can be measured. Here, the standby-time can be multiplied by a specified coefficient and added to the actual working-time to yield the rechargeable battery 1 time-in-use. The time-in-use can be used to evaluate the degree of rechargeable battery 1 performance degradation.

Next, revision of the of the decision threshold value (threshold voltage $V_{th}$) is described based on the degree of rechargeable battery 1 degradation determined as described above. For the case where the degree of rechargeable battery 1 degradation is determined by the change in charging capacity, the initial default threshold voltage $V_{th}$ for a new rechargeable battery 1 can be revised according to the ratio of the full-charge capacity determined during use (FC) to the design-specified full-charge capacity for the unused rechargeable battery 1 (design capacity DC) (FC/DC). Specifically, threshold voltage $V_{th}$ corresponding to the degree of rechargeable battery 1 degradation can be found by dividing the initial threshold voltage init$V_{th}$ by the ratio described above $$V_{th} = \text{init}V_{th}/(FC/DC).$$

Here, 1/(FC/DC) is the degree of degradation.

The initial threshold voltage init$V_{th}$ depends on the inherent structure of the rechargeable battery 1. For example, for the case of the previously described rechargeable battery 1 with battery cell voltage $V_{cell}$ greater than or equal to 3.85V, $V_{th}$ can be 30 mV (30 min time interval), and for battery cell voltage $V_{cell}$ less than 3.85V, $V_{th}$ can be 40 mV (120 min time interval). For the case where the rechargeable battery 1 has two battery cells connected in parallel, $V_{th}$ can be 15 mV (30 min time interval) and 20 mV (120 min time interval). For the case where the rechargeable battery 1 has three battery cells connected in parallel, $V_{th}$ can be 10 mV (30 min time interval) and 13 mV (120 min time interval). If necessary, the threshold voltage $V_{th}$ can also be revised by processing such as multiplying $V_{th}$ by a specified coefficient and adding to $V_{th}$.

Further, threshold voltage $V_{th}$ can be revised according to the number of charging and discharging cycles. For example, a correction voltage determined by multiplying the number of charging and discharging cycles N by a specified coefficient (for example, 0.06) can be added to the initial threshold voltage init$V_{th}$. Or, a preset coefficient corresponding to the charging and discharging cycle count N can be multiplied times the initial threshold voltage init$V_{th}$ to find the threshold voltage $V_{th}$ corresponding to the degree of rechargeable battery 1 degradation. Threshold voltage $V_{th}$ can also be revised according to internal battery resistance. Here, a table of threshold voltage $V_{th}$ versus internal resistance can be established in advance, and by reference to the table, threshold voltage $V_{th}$ can be determined corresponding to the degree of battery degradation.

Figure 3:
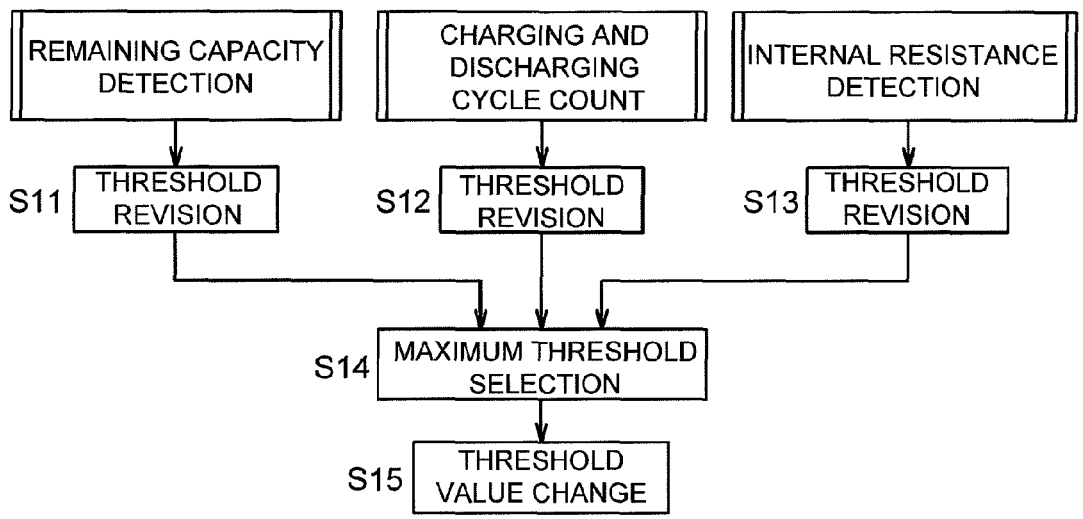
FIG. 3 is a flowchart showing revision of the threshold voltage depending on the amount of rechargeable battery degradation in an embodiment of the present invention.
Figure 4:
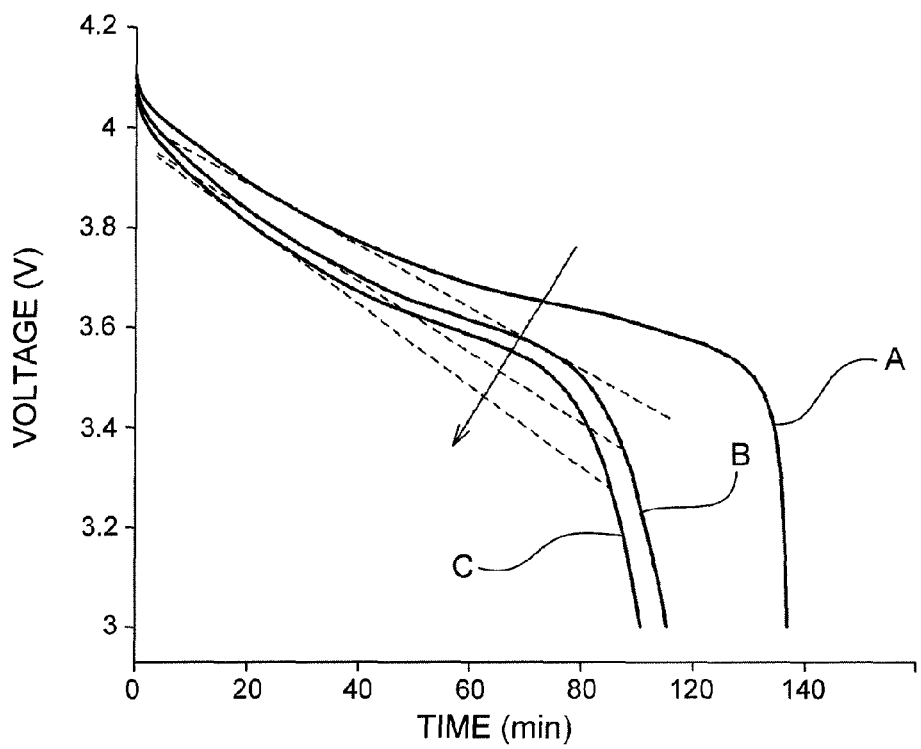
FIG. 4 is a graph comparing the drop in battery voltage characteristics due to internal short circuiting for a new rechargeable battery and a rechargeable battery with degraded characteristics.

As another technique to evaluate the degree of rechargeable battery 1 degradation, FIG. 3 shows the use of a plurality of degradation mechanisms. For example, in FIG. 3, the threshold voltage $V_{th}$ is revised according to each different degradation mechanism [steps S11, S12, S13], and the largest of those threshold voltages $V_{th}$ is selected [step S14] and used to determine internal short circuit.

The abnormality detection apparatus described above is provided with the capability to incrementally increase the threshold voltage Vth used to determine internal short circuit according to the degree of rechargeable battery 1 degradation. As a result, a rechargeable battery 1 with increased self-discharge simply due to performance degradation is not mistakenly determined to have an internal short circuit. Consequently, there is no concern that a rechargeable battery 1 with no internal short circuit could be rejected for ungrounded reasons, and the performance capability of a rechargeable battery 1 can be maximized until the battery has reached the end of its lifetime.

Finally, the present invention is not restricted to the embodiments described above, and rechargeable batteries other than lithium ion batteries can be similarly employed. In short, the present invention can be embodied with various changes without deviating from the substance of the invention.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-24687 filed in Japan on Feb. 5, 2009, the content of which is incorporated herein by reference.

What is claimed is:

1. A rechargeable battery abnormality detection apparatus comprising:
    an internal short circuit detection section that monitors the change in battery voltage when rechargeable battery charging and discharging is suspended, and determines internal short circuit abnormality when the voltage drop during a preset time interval exceeds a preset threshold voltage;
    a degradation appraisal section that evaluates the degree of rechargeable battery degradation; and
    a threshold control section that incrementally increases the threshold voltage according to the degree of degradation evaluated by the degradation appraisal section.

2. The rechargeable battery abnormality detection apparatus as cited in claim 1 wherein the case of a rechargeable battery made up of a plurality of series-connected battery cells, the internal short circuit detection section determines the voltage drop $\Delta V_x$ for each battery cell, the maximum battery cell voltage drop $max\Delta V_x$, and the minimum battery cell voltage drop $min\Delta V_x$; and the difference between the maximum and minimum voltage drops $[max\Delta V_x - min\Delta V_x]$ is used as the voltage drop to determine rechargeable battery internal short circuit abnormality.

3. The rechargeable battery abnormality detection apparatus as cited in claim 1 wherein the degradation appraisal section evaluates the degree of rechargeable battery degradation based on at least one of the following mechanisms: the change in rechargeable battery full-charge capacity; the number of rechargeable battery charging and discharging cycles; and the change in rechargeable battery internal resistance.

4. The rechargeable battery abnormality detection apparatus as cited in claim 1 wherein the threshold control section revises the previously determined threshold voltage with the highest of the following threshold voltages: the threshold voltage incrementally increased according to the change in rechargeable battery full-charge capacity; the threshold voltage incrementally increased according to the number of rechargeable battery charging and discharging cycles; and the threshold voltage incrementally increased according to the change in rechargeable battery internal resistance.

5. The rechargeable battery abnormality detection apparatus as cited in claim 1 wherein the internal short circuit detection section determines rechargeable battery voltage drop during a preset time interval that depends on the rechargeable battery voltage.

6. The rechargeable battery abnormality detection apparatus as cited in claim 1 further comprising:
    a charging and discharging detection section that monitors rechargeable battery charging and discharging current, and activates the internal short circuit detection section when no rechargeable battery charging or discharging is detected.

7. A rechargeable battery apparatus characterized by providing a rechargeable battery, and a rechargeable battery abnormality detection apparatus as cited in claim 1.

8. A rechargeable battery apparatus characterized by providing a rechargeable battery, a rechargeable battery abnormality detection apparatus as cited in claim 1, and a cut-off device that prohibits rechargeable battery use when the abnormality detection apparatus detects rechargeable battery internal short circuit.

9. A rechargeable battery abnormality detection apparatus comprising:
    a plurality of rechargeable batteries connected in series;
    a voltage detection section that detects rechargeable battery voltage;
    a current detection section that detects rechargeable battery current;
    a charging and discharging detection section that monitors rechargeable battery charging and discharging current via the current detection section, and activates the internal short circuit detection section when no rechargeable battery charging or discharging is detected;
    an internal short circuit detection section that monitors the change in battery voltage via the voltage detection section when rechargeable battery charging and discharging is suspended, and determines internal short circuit abnormality when the voltage drop during a preset time interval exceeds a preset threshold voltage;
    a degradation appraisal section that evaluates the degree of rechargeable battery degradation; and
    a threshold control section that incrementally increases the threshold voltage according to the degree of degradation evaluated by the degradation appraisal section.

* * * * *